United States Patent Office 3,350,426
Patented Oct. 31, 1967

3,350,426
6α,16α-DIMETHYL-1,4-PREGNADIEN-17α-OL-
3,20 DIONE AND ESTERS THEREOF
Howard J. Ringold, Shrewsbury, Mass., and Carl Djerassi,
Palo Alto, Calif., assignors to Syntex Corporation,
Panama, Panama, a corporation of Panama
No Drawing. Filed June 14, 1962, Ser. No. 208,170
The portion of the term of the patent subsequent to
Dec. 8, 1981, has been disclaimed
5 Claims. (Cl. 260—397.4)

The present invention relates to novel cyclopentanophenanthrene compounds.

This application is a continuation-in-part of our co-pending applications Ser. Nos. 773,818 now Patent No. 3,158,629 and 773,830, filed Nov. 14, 1958, now abandoned.

More particularly the present invention relates to novel compounds of the pregnane series and more specifically 16α-methyl-17α-acyloxy - $\Delta^1$ - dehydro-progesterones, 6α, 16α-dimethyl-17α-acyloxy-$\Delta^1$ - dehydro-progesterones and the corresponding free compounds which are potent progestational hormones when administered either orally or by injection. The foregoing compounds are also diuretic agents.

The novel compounds of the present invention are illustrated by the following formula:

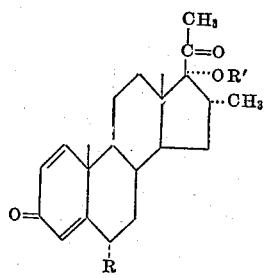

In the above formula R indicates a hydrogen atom or a methyl group and R' represents hydrogen or a hydrocarbon carboxylic ester group of less than 12 carbon atoms, straight chain or branched chain aliphatic, cyclic, cyclo-aliphatic, or aromatic and which may be substituted such as with halogen or methoxy. Typical examples of such ester groups are the acetate, propionate, enanthate, hemisuccinate, trimethylacetate, benzoate, cyclopentylpropionate, phenoxyacetate and β-chloropropionate.

The following equation illustrates the process for preparing 16α-methyl-17α-hydroxy-$\Delta^1$-dehydro - progesterone and the corresponding esters.

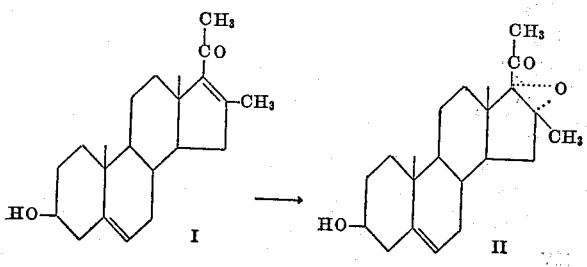

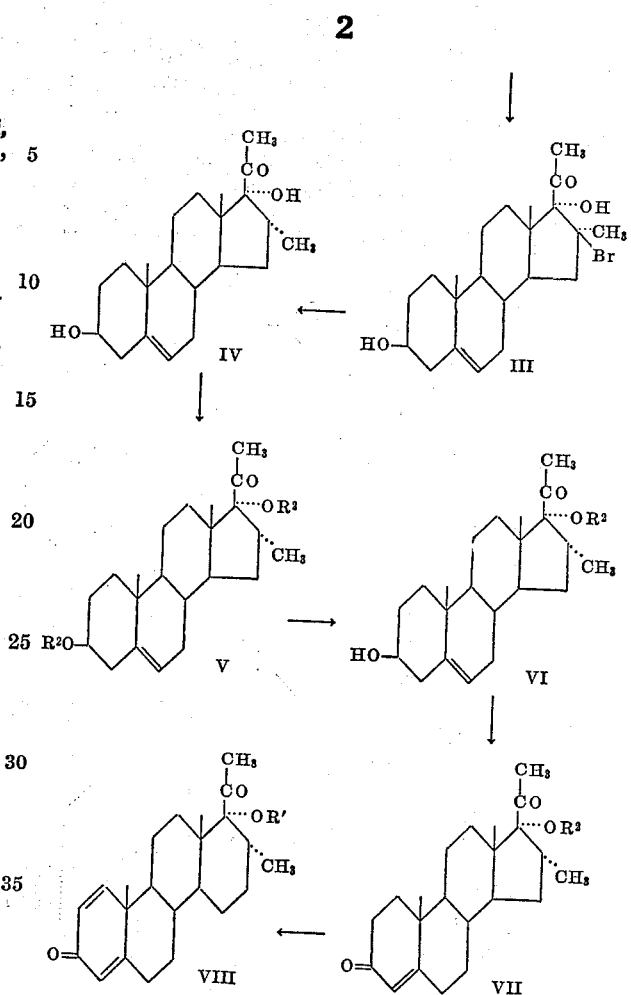

In the above equation R' has the same meaning as heretofore set forth, R² represents an acyl group of less than 12 carbon atoms.

In practicing the process as above set forth 16-methyl-$\Delta^{5,16}$-pregnadien-3β-ol-20-one (I) was dissolved in a polar organic solvent and the $\Delta^{16}$-double bond preferably epoxidized by treatment with a peroxide in alkaline medium as for example with hydrogen peroxide in aqueous sodium hydroxide methanol mixture by allowing to stand for approximately 12 hours at around 0° C.; isolation and purification furnished 16-methyl-16α,17α-oxido-$\Delta^5$-pregnen-3β-ol-20-one (II). The last compound was dissolved in an organic solvent, as for example methylene chloride and treated with a hydrogen halide such as hydrogen bromide dissolved in acetic acid at room temperature for several hours; this led to the opening of 16α, 17α-oxido ring and formation of 17α-hydroxyl function. The isolated and purified 17α-hydroxy-16-methyl 16-bromo-compound (III) was dehalogenated with a metal catalyst such as for example Raney nickel or palladium deposited on calcium carbonate by dissolving the last compound in a polar organic solvent such as methanol, adding the catalyst as above set forth and heating the mixture for several hours preferably under nitrogen atmosphere. Separation and purification gave 16α-methyl-$\Delta^5$-pregnen-3β,17α-diol-20-one (IV).

Acetylation of the above compound under fairly drastic conditions, such as for example by dissolving in acetic anhydride, adding p-toluenesulfonic acid, and allowing to stand at room temperature for 24 hours, produced the diacetate (V), which was isolated by pouring the reaction mixture into water whereby it precipitated. The diacetate was dissolved in a polar organic solvent preferably a lower aliphatic alcohol such as methanol, a dilute solution of an alkali metal hydroxide, carbonate, bicarbonate or alkoxide such as potassium hydroxide was added while stirring and the reaction mixture was allowed to stand at room temperature for several hours preferably under nitrogen atmosphere. Isolation and purification gave 16α-methyl-Δ⁵-pregnen-3β,17α-diol-20-one 17-acetate (VI).

Oppenauer oxidation of the last compound, such as for example with aluminum isopropylate in a mixture of dry toluene and cyclohexanone, isolation and purification gave 16α-methyl-17α-acetoxy-progesterone (VII). When in the esterification step described above another anhydride or acid chloride of a hydrocarbon carboxylic acid of less than 12 carbon atoms was used there was prepared instead of the 17-acetate the corresponding 17-ester.

The above esters were dissolved in t-butanol, selenium dioxide was added and the mixture refluxed preferably in presence of pyridine for approximately 48 hours. Isolation and purification gave Δ¹-dehydro-16α-methyl-17α-acetoxy-progesterone or other corresponding esters of hydrocarbon carboxylic acids of less than 12 carbon atoms (VIII; R'=acyl). Conventional saponification of the latter compounds, as for example by reflux with dilute potassium hydroxide solution in methanol gave Δ¹-dehydro-16α-methyl-17α-hydroxy-progesterone (VIII; R'=H).

The process for making 6α,16α-dimethyl-Δ¹-dehydro-17α-acyloxy-progesterone is illustrated by the following sequence of reactions:

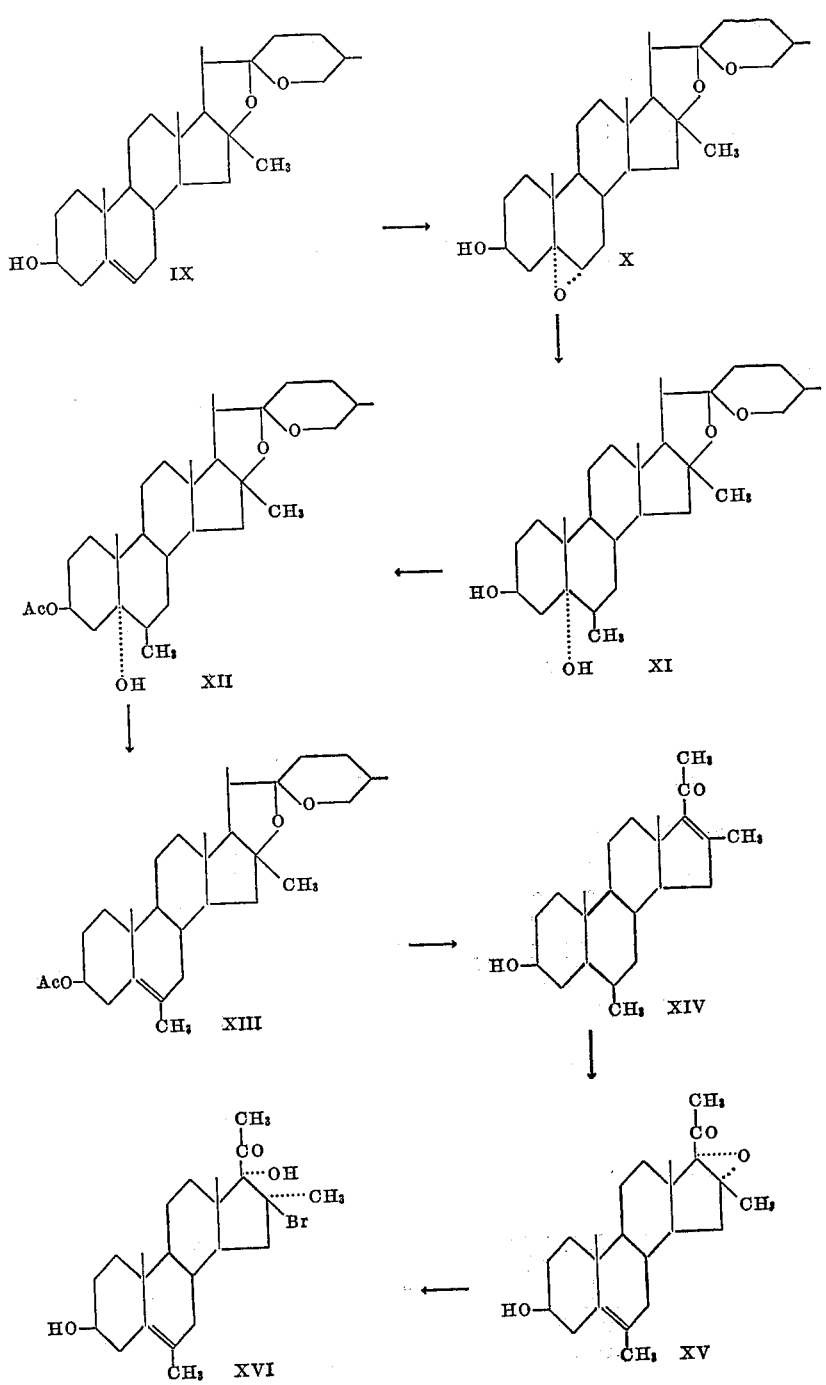

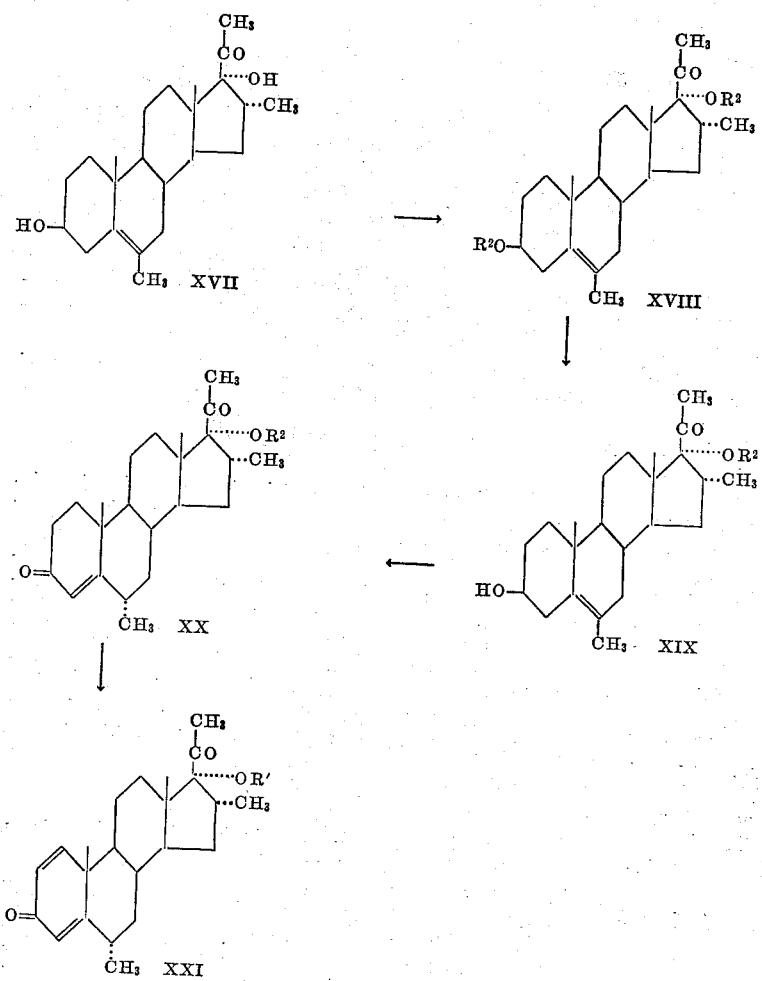

In the above equation R' and R² have the same meaning as heretofore set forth.

In practicing the process outlined above, 16-methyl-diosgenin (IX) described by S. Kaufmann et al. J. Am. Chem. Soc., 71, 3552 (1949) was epoxidized by reaction with a peracid, preferably an aromatic peracid, such as perbenzoic acid to form the corresponding 5α,6α-oxido derivative (X). This last compound was then treated with methyl magnesium bromide to form 6β,16-dimethyl-22a,25D-spirostan-3β,5α-diol (XI). The hydroxy group at C-3 was then selectively acetylated with acetic anhydride and the resulting diol monoacetate (XII) was then dehydrated by reaction with thionyl chloride in pyridine, thereby producing the acetate of 6β,16-dimethyl-diosgenin (XIII). By conventional oxidative degradation, the side chain was degraded, thus producing 6-16-dimethyl-Δ⁵,¹⁶-pregnadien-3β-ol-20-one (XIV).

The double bond between C-16 and C-17 of the latter compound was then epoxidized, preferably with hydrogen peroxide in alkaline aqueous methanol, to form the 16α,17α-oxido compound (XV) and the epoxide ring of this compound was then opened by reaction with hydrogen bromide, thus producing 6,16α-dimethyl-16β-bromo-Δ⁵-pregnen13β,17α-diol-20-one (XVI). Dehalogenation of the preceding compound with Raney nickel gave 6,16α-dimethyl-Δ⁵-pregnen-3β,17α-diol-20-one (XVII). Treatment of this compound under conditions known for the introduction of a 17α-ester group, i.e. as by treatment with an excess of anhydride of a hydrocarbon carboxylic acid preferably in the presence of an acid catalyst, gave the corresponding diesters of hydrocarbon carboxylic acids of less than 12 carbon atoms (XVIII). The ester group at C-3 of the diesters thus formed were then selectively hydrolyzed by a mild alkaline treatment to give the corresponding 6,16α-dimethyl-17α-acyloxy-Δ⁵-pregnen 3β-ol-20-one derivative (XIX). Upon oxidation of these compounds by the Oppenauer method there were obtained the corresponding 6α,16α-dimethyl-17α-acyloxy-Δ⁴-pregnen-3,20-dione compounds (XX). For the introduction of an additional bond between C-1 and C-2 of these compounds, they were treated by known methods with selenium dioxide or by microbiological methods as, for example, incubation with Corynebacterium simplex.

Conventional saponification of the 6α,16α-dimethyl-17α-acyloxy-Δ¹,⁴-pregnadien-3,20-dione compounds (XXI, R'=acyl) gave the free compound, i.e., 6α,16α-dimethyl-Δ¹-dehydro-17α-hydroxy-progesterone (XXI, R'=H).

The following examples serve to illustrate but are not intended to limit the scope of the present invention:

EXAMPLE I

A solution of 10 g. of 16α-methyl-Δ⁵,¹⁶-pregnadien-3β-ol-20-one (Bol. Inst. Quim. Mex. 4, 125 (1952)) in 700 cc. of methanol was cooled to 15° C. and treated with 20 cc. of 4 N aqueous sodium hydroxide solution and then with 40 cc. of 30% aqueous hydrogen peroxide solution, under stirring and maintaining the temperature below 15° C. The mixture was kept overnight in the refrigerator and then poured into 2750 cc. of ice water; the precipitate formed was collected by filtration, washed with water and dried, thus giving 16-methyl-16α,17α-oxido-Δ⁵-pregnen-3β-ol-20-one in crude form which was used for the next step without further purification.

10 g. of the above compound was suspended in 100 cc. of methylene chloride, cooled to 10° C. and mixed with 10 cc. of a saturated solution of hydrogen bromide in acetic acid, slowly, under continuous stirring and taking care that the temperature did not rise over 15° C. The stirring was continued at room temperature for half an hour and the mixture was then diluted with water; the organic layer was separated, washed with water, dried over anhydrous sodium sulfate and evaporated under reduced pressure. The residue was used for the next step without further purification. In another experiment, the residue consisting of 16α-methyl-16β-bromo-Δ5-pregnen-3β,17α-diol-20-one was purified by recrystallization from acetone-hexane.

5 g. of the above crude bromohydrin was added to a suspension of 10 g. of Raney nickel in 150 cc. of methanol and the mixture was refluxed under an atmosphere of nitrogen for 4 hours. It was then filtered under nitrogen and the filtrate was concentrated until a bulky precipitate was obtained, which was collected, washed with water and dried. Chromatography of the product on silica gel afforded 16α-methyl-Δ5-pregnen-3β,17α-diol-20-one.

2 g. of 16α-methyl-Δ5-pregnen-3β,17α-diol-20-one was treated with 20 cc. of acetic anhydride and 200 mg. of p-toluenesulfonic acid for 24 hours at a temperature around 25° C.; the mixture was then poured into water, heated for half an hour on the steam bath, cooled and the precipitate was collected, thus yielding the crude 3,17-diacetate of 16α-methyl-Δ5-pregnen-3β,17α-diol-20-one. In another experiment the compound was obtained in pure form by recrystallization from acetone-hexane.

The above crude compound was treated with 50 cc. of a 1% solution of potassium hydroxide for 2 hours at 0° C., under an atmosphere of nitrogen and then diluted with water. The precipitate was filtered, washed with water, dried and recrystallized from methanol, thus furnishing 16α-methyl-Δ5-pregnen-3β,17α-diol-20-one 17-monoacetate.

A mixture of 1.5 g. of the above compound, 60 cc. of dry toluene and 12 cc. of cyclohexanone was distilled until 8 cc. of distillate was collected in order to remove traces of moisture. A solution of 3.3 g. of aluminum isopropylate in 12 cc. of anhydrous toluene was then added and the mixture was refluxed for 3 hours and treated with 110 cc. of an aqueous solution of sodium potassium tartrate. The solvents were removed by steam distillation and the solid was filtered from the cooled mixture, washed with water and dried. Recrystallization from aqueous methanol yielded 16α-methyl-Δ4-pregnen-17α-ol-3,20-dione 17-acetate.

A mixture of 1 g. of the above compound, 50 cc. of t-butanol, 0.4 g. of recently sublimed selenium dioxide and 0.2 cc. of pyridine was refluxed under an atmosphere of nitrogen for 48 hours. The mixture was filtered through celite, washing the filter with hot t-butanol, and the combined filtrate and washings was evaporated to dryness under reduced pressure. The residue was refluxed in acetone solution with decolorizing charcoal for 1 hour, filtered through celite and the acetone was evaporated. The residue was purified by chromatography on neutral alumina, thus producing 16α-methyl-Δ1,4-pregnadien-17α-ol-3,20-dione 17-acetate.

A mixture of 200 mg. of the preceding compound and 25 cc. of 1% methanolic potassium hydroxide solution was refluxed during 1 hour. It was then poured into ice water and the formed precipitate collected by filtration, thus producing 16α-methyl-Δ1,4-pregnadien-17α-ol-3,20-dione.

EXAMPLE II

In another experiment, the 3-acetate of 16-methyl-Δ5,16-pregnadien-3β-ol-20-one was treated with hydrogen peroxide as described in Example I, which produced the simultaneous hydrolysis of the acetate group at C-3, and thus there was obtained 16-methyl-16α,17α-oxido-Δ5-pregnen-3β-ol-20-one, identical with the one obtained in accordance with the previous example.

EXAMPLE III

In the step of preparation of the diester of 16α-methyl-Δ5-pregnen-3β,17α-diol-20-one, in accordance with Example I, there was substituted the acetic anhydride for propionic anhydride and then the propionoxy group at C-3 of the 3,17-dipropionate of 16α-methyl-Δ5-pregnen-3β,17α-diol-20-one was selectively hydrolyzed as described in Example I. Oppenauer oxidation of the resulting product by the method of Example I yielded 16α-methyl-Δ4-pregnen-17α-ol-3,29-dione 17-propionate; dehydrogenation of the latter by refluxing with selenium dioxide by the method of Example I afforded 16α-methyl-Δ1,4-pregnadien-17α-ol-3,20-dione 17-propionate.

EXAMPLE IV

When there was substituted in the conventional acylation method of Examples I and III another anhydride or acid chloride of a hydrocarbon carboxylic acid of less than 12 carbon atoms there were obtained the corresponding 3,17-diesters and 17-monoesters of 16α-methyl-Δ5-pregnen-3β,17α-diol-20-one as well as the corresponding C—17 esters of 16α-methyl-Δ4-pregnen-17α-ol-3,20-dione and of 16α - methyl-Δ1,4-pregnadien-17α-ol-3,20-dione. Specifically there were prepared in this way in addition to the acetates and propionates previously described the cyclopentylpropionates, caproates and the benzoates.

EXAMPLE V 100 g. of 16-methyl-diosgenin in 2 lt. of chloroform was treated with 1.1 molar equivalents of perbenzoic acid in chloroform solution at room temperature, in the dark, for a period of 24 hours; the solution was washed with 5% sodium carbonate solution and water, dried over anhydrous sodium sulfate and evaporated to dryness. The residue was purified by chromatography on washed alumina to give 16-methyl-5α,6α-oxido-22a,25D-spirostan-3β-ol.

50 g. of the above compound was dissolved in 1 lt. of thiophene free anhydrous benzene, mixed with 250 cc. of a 3 N ether solution of methyl magnesium bromide and refluxed for 6 hours. The cooled mixture was poured into 5 lt. of a cold solution of 200 g. of ammonium chloride in water; the organic layer was separated, the aqueous phase was extracted with ethyl acetate and the combined benzene layer and extract was washed with saturated aqueous sodium chloride solution, dried over anhydrous sodium sulfate and evaporated to dryness. The residue was purified by chromatography on neutral alumina, thus yielding 6β,16-dimethyl-22a,25D-spirostan-3β,5α-diol.

The treatment of a solution of the above compound in 200 cc. of pyridine with 50 cc. of acetic anhydride at room temperature overnight, followed by dilution with water, short heating on the steam bath, cooling and filtration of the precipitate furnished the 3-acetate of 6β,16-dimethyl-22a,25D-spirostan-3β,5α-diol, which was purified by recrystallization from acetone-hexane.

40 g. of 6β,16-dimethyl-22a,25D-spirostan-3β,5α-diol 3-acetate was dissolved in 300 cc. of pyridine, cooled to 0° C. and treated with 20 cc. of thionyl chloride. The mixture was kept for 15 minutes at 0° C., then poured into ice water and the reaction product was extracted with ether. The extract was washed with dilute hydrochloric acid and water, dried over anhydrous sodium sulfate and evaporated to dryness. The residue crystallized from acetone-hexane to yield 6,16-dimethyl-diosgenin acetate.

A mixture of 30 g. of 6,16-dimethyl-diosgenin acetate and 120 cc. of acetic anhydride was heated in a sealed tube at temperatures around 190° C., for 8 hours, cooled and poured into ice water, the reaction product was extracted with ether, washed with 5% sodium carbonate solution, dried over anhydrous sodium sulfate and evaporated to dryness. Recrystallization of the residue from acetone-hexane afforded 6,16-dimethyl-pseudo-diosgenin diacetate.

20 g. of the above compound was dissolved in a mixture of 350 cc. of acetic acid, 200 cc. of methylene dichloride and 100 cc. of water, with slight heating. The solution was cooled to 15° C. and treated dropwise under stirring with a solution of 10 g. of chromium trioxide in 200 cc. of 90% acetic acid. The mixture was allowed to react for 2 hours at room temperature and then poured into water. The methylene dichloride layer was separated by decantation, the aqueous phase was extracted with chloroform and the combined methylene dichloride and chloroform solution was washed with water, dried over anhydrous sodium sulfate and evaporated to dryness. The residue crystallized from acetone-hexane to give the 16-($\gamma$-methyl-$\delta$-acetoxy)-valerate of 16-methyl - 3$\beta$ - acetoxy-$\Delta^5$-pregnen-16-ol-20-one.

15 g. of the above diosone was refluxed for 1 hour with a mixture of 10 g. of potassium hydroxide, 200 cc. of acetone and 100 cc. of water. The mixture was acidified with acetic acid, concentrated to a small volume and poured into water; the precipitate was collected, washed with water, air dried and recrystallized from acetone-hexane. There was thus obtained 6,16-dimethyl-$\Delta^{5,16}$-pregnadien-3$\beta$-ol-20-one.

10 g. of 6,16 - dimethyl-$\Delta^{5,16}$-pregnadien-3$\beta$-ol-20-one was dissolved in 700 cc. of methanol, cooled to 15° C. and treated under stirring with 20 cc. of 4 N aqueous sodium hydroxide solution followed by 40 cc. of 30% aqueous hydrogen peroxide solution, while the temperature of the mixture was maintained below 15° C. The mixture was kept standing overnight in the refrigerator and then poured into 2,750 cc. of ice water; the precipitate was collected by filtration, washed with water, and dried, thus giving the crude 6,16-dimethyl-16$\alpha$,17$\alpha$-oxido-$\Delta^5$-pregnen-3$\beta$-ol-20-one, which was used for the next step without further purification. The analytical sample was obtained by recrystallization from methanol.

10 g. of the above crude compound was suspended in 100 cc. of methylene dichloride, cooled to 10° C. and slowly mixed under stirring with 10 cc. of a saturated solution of dry hydrogen bromide in acetic acid, while the temperature of the mixture was maintained below 15° C. The stirring was continued at room temperature for half an hour and the mixture was diluted with ice water; the organic phase was separated, washed with water, dried over anhydrous sodium sulfate and the methylene chloride was removed by distillation under reduced pressure. The residue was used as such for the next stage, without further purification. In another experiment the residue was crystallized from acetone-hexane, to furnish the pure 6,16$\alpha$-dimethyl-16$\beta$-bromo-$\Delta^5$-pregnen-3$\beta$,17$\alpha$-diol-20-one.

5 g. of the above crude bromohydrin was added to a suspension of 10 g. of Raney nickel in 150 cc. of methanol and the mixture was refluxed for 4 hours under an atmosphere of nitrogen; the nickel was filtered under an atmosphere of nitrogen and the filtrate was concentrated until a bulky precipitate was obtained, which was filtered, washed with water and dried. Chromatography of the residue on silica gel afforded 6,16$\alpha$-dimethyl-$\Delta^5$-pregnen-3$\beta$,17$\alpha$-diol-20-one.

2 g. of 6,16$\alpha$-dimethyl-$\Delta^5$-pregnen-3$\beta$,17$\alpha$-diol-20-one was mixed with 20 cc. of acetic anhydride and 200 mg. of p-toluenesulfonic acid and kept for 24 hours at a temperature around 25° C. The mixture was poured into ice water, heated for half an hour on the steam bath, cooled and the precipitate was filtered, thus giving the crude 6,16$\alpha$-dimethyl-$\Delta^5$-pregnen-3$\beta$,17$\alpha$-diol-20-one 3,17-diacetate. In another experiment this compound was obtained in pure form by recrystallization from acetone-hexane.

The above crude compound was treated with 50 cc. of 1% potassium hydroxide solution at 0° C. under an atmosphere of nitrogen for 2 hours; after diluting with water the precipitate was collected, washed with water, dried and recrystallized from methanol. There was thus obtained 6,16$\alpha$-dimethyl-$\Delta^5$-pregnen-3$\beta$,17$\alpha$-diol-20-one-17-acetate.

1.5 g. of the above compound was mixed with 60 cc. of dry toluene and 12 cc. of cyclohexanone and traces of moisture were removed by distillation of about 8 cc. of the mixture; there was then added a solution of 3.3 g. of aluminum isopropylate in 12 cc. of anhydrous toluene and the mixture was refluxed for 3 hours. It was then diluted with 110 cc. of a solution of sodium potassium tartrate and the volatile solvents were removed by steam distillation. The residue was cooled and the solid precipitate was filtered, washed with water, dried and recrystallized from aqueous methanol, thus yielding 6$\alpha$,16$\alpha$-dimethyl-$\Delta^4$-pregnen-17$\alpha$-ol-3,20-dione acetate.

A mixture of 1 g. of 6$\alpha$,16$\alpha$-dimethyl-17$\alpha$-acetoxy-progesterone, obtained as described above, 50 cc. of t-butanol, 0.4 g. of recently sublimed selenium dioxide and 0.2 cc. of pyridine was refluxed under an atmosphere of nitrogen for 48 hours, cooled, filtered through celite, washing the filter with a little hot t-butanol, and the combined filtrate and washings were evaporated to dryness under reduced pressure. The residue was refluxed in acetone solution with decolorizing charcoal for 1 hour, filtered through Celite and the acetone was removed by distillation. Chromatography of the residue on neutral alumina yielded 6$\alpha$,16$\alpha$-dimethyl-$\Delta^{1,4}$-pregnadien-17$\alpha$-ol-3,20-dione acetate.

EXAMPLE VI

In the method of the preceding example in the step of the preparation of the diester of 6,16$\alpha$-dimethyl-$\Delta^5$-pregnen-3$\beta$,17$\alpha$-diol-20-one, there was substituted the acetic anhydride for a propionic anhydride. There was thus obtained the dipropionate of this diolone, which was selectively hydrolyzed at the propionoxy group at C-3, by means of the aforementioned alkaline treatment, except that it was conducted for 6 hours. The Oppenauer oxidation then gave 6$\alpha$,16$\alpha$ - dimethyl - 17$\alpha$ - hydroxyprogesterone 17-propionate, and finally there was obtained 6$\alpha$,16$\alpha$-dimethyl-$\Delta^{1,4}$-pregnadien-17$\alpha$-ol-3,20-dione propionate.

EXAMPLE VII

When in the methods of the previous examples the acetic anhydride or propionic anhydride were substituted by another anhydride of a hydrocarbon carboxylic acid having up to 12 carbon atoms, there were obtained the corresponding diesters and 17-monoesters of 6,16$\alpha$-dimethyl-$\Delta^5$-pregnen-3$\beta$,17$\alpha$-diol-20-one and then the corresponding 17-esters of 6$\alpha$,16$\alpha$-dimethyl-$\Delta^4$-pregnen-17$\alpha$-ol-3,20-dione and of 6$\alpha$,16$\alpha$-dimethyl-$\Delta^{1,4}$-pregnadien-17$\alpha$-ol-3-20-dione, respectively. Specifically there were thus prepared the cyclopentylpropionates, caproates and benzoates.

EXAMPLE VIII

In accordance with the method of Example I, 200 mg. of the acetate of 6$\alpha$,16$\alpha$-dimethyl-$\Delta^{1,4}$-pregnadien-17$\alpha$-ol-3,20-dione were saponified by reflux with 1% methanolic potassium hydroxide solution, thus affording 6$\alpha$,16$\alpha$-dimethyl-$\Delta^{1,4}$-pregnadien-17$\alpha$-ol-3,20-dione.

We claim:

1. The acetate of 6$\alpha$,16$\alpha$-dimethyl-$\Delta^{1,4}$-pregnadien-17$\alpha$-ol-3,20-dione.

2. The propionate of 6α,16α-dimethyl-Δ$^{1,4}$-pregnadien-17α-ol-3,20-dione.

3. The caproate of 6α,16α-dimethyl-Δ$^{1,4}$-pregnadien-17α-ol-3,20-dione.

4. The cyclopentylpropionate of 6α,16α-dimethyl-Δ$^{1,4}$-pregnadien-17α-ol-3,20-dione.

5. The benzoate of 6α,16α-dimethyl-Δ$^{1,4}$-pregnadien-17α-ol-3,20-dione.

References Cited

UNITED STATES PATENTS

| | | | |
|---|---|---|---|
| 2,894,693 | 7/1959 | Gould et al. | 260—397.45 |
| 2,971,886 | 2/1961 | Babcock et al. | 167—55 |

ELBERT L. ROBERTS, *Primary Examiner.*

G. E. LANDE, *Assistant Examiner.*